United States Patent
Kim et al.

(10) Patent No.: US 9,562,164 B2
(45) Date of Patent: Feb. 7, 2017

(54) MICRO-POROUS POLYOLEFIN COMPOSITE FILM HAVING EXCELLENT HEAT RESISTANCE AND STABILITY AND METHOD FOR PRODUCING THE SAME

(71) Applicant: SK Innovation Co., Ltd., Seoul (KR)

(72) Inventors: Yong Kyoung Kim, Daejeon (KR); Jang-Weon Rhee, Daejeon (KR); Dong Jin Joo, Daejeon (KR); Young Jun Woo, Daejeon (KR); Jae Woong Kim, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 14/355,729

(22) PCT Filed: Oct. 29, 2012

(86) PCT No.: PCT/KR2012/008937
§ 371 (c)(1),
(2) Date: May 1, 2014

(87) PCT Pub. No.: WO2013/066012
PCT Pub. Date: May 10, 2013

(65) Prior Publication Data
US 2014/0295170 A1    Oct. 2, 2014

(30) Foreign Application Priority Data

Nov. 3, 2011   (KR) .................. 10-2011-0113713

(51) Int. Cl.
*C09D 7/12*        (2006.01)
*H01M 2/14*       (2006.01)
(Continued)

(52) U.S. Cl.
CPC ............ *C09D 7/1216* (2013.01); *H01M 2/145* (2013.01); *H01M 2/166* (2013.01);
(Continued)

(58) Field of Classification Search
CPC ............................................. Y10T 428/249978
See application file for complete search history.

(56) References Cited

U.S. PATENT DOCUMENTS

| 6,432,586 | B1 | 8/2002 | Zhang |
| 2006/0046149 | A1 | 3/2006 | Yong et al. |

(Continued)

FOREIGN PATENT DOCUMENTS

| CN | 1325145 A | 12/2001 |
| CN | 101542777 A | 9/2009 |

(Continued)

*Primary Examiner* — Hai Vo
(74) *Attorney, Agent, or Firm* — The Webb Law Firm

(57) ABSTRACT

Provided is a micro-porous polyolefin composite film, the micro-porous polyolefin composite film including a porous coating layer containing a polymer binder and inorganic particles, the polymer binder simultaneously employing an aqueous polymer and a non-aqueous polymer. The contents of the aqueous polymer and the non-aqueous polymer are controlled, and thus optimize heat resistance, adhesive strength, and the moisture content to thereby improve high-temperature stability, and, further, improve the adhesive strength to thereby improve stability in production, and minimize the moisture content to thereby improve reliability of a battery.

4 Claims, 4 Drawing Sheets

(51) Int. Cl.
*H01M 2/16* (2006.01)
*H01M 10/052* (2010.01)

(52) U.S. Cl.
CPC ........ *H01M 2/1686* (2013.01); *H01M 10/052* (2013.01); *Y02T 10/7011* (2013.01); *Y10T 428/249978* (2015.04)

(56) References Cited

U.S. PATENT DOCUMENTS

| | | | |
|---|---|---|---|
| 2009/0111026 A1* | 4/2009 | Kim | H01M 2/145 429/252 |
| 2009/0291360 A1 | 11/2009 | Kim et al. | |
| 2010/0151334 A1 | 6/2010 | Ozaki et al. | |
| 2010/0203396 A1* | 8/2010 | Murata | H01M 2/1653 429/247 |
| 2011/0124766 A1* | 5/2011 | Yang | C07D 311/86 522/126 |
| 2011/0236762 A1 | 9/2011 | Huang et al. | |
| 2011/0281150 A1 | 11/2011 | Yong et al. | |
| 2011/0281171 A1 | 11/2011 | Yong et al. | |
| 2011/0281172 A1 | 11/2011 | Yong et al. | |
| 2012/0015254 A1* | 1/2012 | Lee et al. | 429/246 |
| 2012/0028104 A1 | 2/2012 | Brant et al. | |
| 2012/0273114 A1 | 11/2012 | Takita et al. | |
| 2013/0183570 A1 | 7/2013 | Yong et al. | |
| 2013/0209861 A1 | 8/2013 | Yong et al. | |
| 2014/0106213 A1* | 4/2014 | Horikawa et al. | 429/185 |

FOREIGN PATENT DOCUMENTS

| | | |
|---|---|---|
| EP | 1146576 A1 | 10/2001 |
| JP | 61141769 A | 6/1986 |
| JP | 2002355938 A | 12/2002 |
| JP | 2004227972 A | 8/2004 |
| JP | 2005-276503 A | 10/2005 |
| KR | 1020070080245 A | 8/2007 |
| KR | 1020080110661 A | 12/2008 |
| KR | 1020090019833 A | 2/2009 |
| KR | 1020090081079 A | 7/2009 |
| KR | 1020100135369 A | 12/2010 |
| WO | 2005049318 A1 | 6/2005 |
| WO | 2010147407 A2 | 12/2010 |
| WO | WO 2011062460 A2 * | 5/2011 |

* cited by examiner

MICRO-POROUS POLYOLEFIN COMPOSITE FILM HAVING EXCELLENT HEAT RESISTANCE AND STABILITY AND METHOD FOR PRODUCING THE SAME

CROSS-REFERENCE TO RELATED APPLICATIONS

This application is the United States national phase of International Application No. PCT/KR2012/008937 filed Oct. 29, 2012, and claims priority to Korean Patent Application No. 10-2011-0113713 filed Nov. 3, 2011, the disclosures of which are hereby incorporated in their entirety by reference.

TECHNICAL FIELD

The following disclosure relates to a micro-porous polyolefin composite film capable of improving thermal stability and moisture characteristics to thereby improve reliability of a battery.

More particularly, the present disclosure relates to a micro-porous polyolefin composite film, capable of significantly increasing adhesive strength between a micro-porous polyolefin film and a porous layer and permeability thereof, to thereby improve stability in production of the battery and long-term stability of the battery, and thus, being suitable as a separator for a high-capacitance/high output lithium secondary battery.

BACKGROUND ART

A micro-porous polyolefin film has been widely used as a battery separator, a separation filter, a micro-filtration separation membrane, or the like, due to excellent chemical stability and superior physical properties thereof. Among them, a separator for a secondary battery has a high level of ion transfer power through inner pores together with a spatial separation function between a cathode and an anode. Recently, the demand for improving characteristics of the separator has been increasing in order to improve electric stability of the battery due to higher capacitance and higher output of the secondary battery. In the case of a lithium ion secondary battery, the degradation in thermal stability of the separator may cause damage or deformation of the separator due to the increase in temperature caused by abnormal behavior of the battery and the accompanying short circuits between electrodes, and further may have risks of overheating, ignition, or explosion of the battery.

Recently, in the conditions where high output/high capacitance of the battery are requested, such as IT, electric drive vehicle (EDV), electric tool, energy storage system, and the like, the possibility of ignition and explosion of the battery generated at the time of abnormal behavior is several times to several tens of times that of the existing battery, and thus, high-temperature thermal stability enabling preparation against the increase in temperature of the battery is acutely needed. The separation having excellent high-temperature thermal stability prevents damage thereof at a high temperature, thereby blocking direct short circuits between electrodes. The battery is overheated when short circuit between electrodes occurs due to foreign materials, such as, dendrite and the like generated in the electrodes during the charging or discharging procedure of the battery. Here, the separator having excellent high-temperature thermal stability prevents fundamental damage thereof, thereby suppressing ignition, explosion, and the like thereof.

Korean Patent Laid-Open Publication No. 2007-0080245 and International Patent Publication No. WO2005/049318 disclose that a polyvinylidene fluoride copolymer, which is a heat-resistant resin, is introduced to a coating layer to thereby improve heat resistance of the separator and thermal stability of the battery, but have limitations in improvement in thermal stability of the battery since an heat-resistant resin in a non-aqueous battery or the like is easily dissolved or gelled in an electrolyte.

Japanese Patent Laid-Open Publication No. 2002-355938 discloses a micro-porous polyolefin composite film using a high heat-resistant resin. The high heat-resistant resin is introduced to the micro-porous polyethylene film by a phase separation method. However, it is difficult to realize efficient permeability by employing a method of using a single resin to form a thin film coating layer and performing a drying process to form pores therein through phase separation. Further, the size and uniformity of phase separation are largely varied depending on the drying conditions such as humidity, temperature, and the like, which has limitations to producing a separator having excellent uniformity in product quality. Moreover, shrinkage of a base layer due to a sharply increase in temperature caused by an abnormal behavior of the battery, such as internal short circuits of the battery, may not be effectively blocked due to its loose structure. Since the coating layer itself is not thermally deformed at 130° C., which is almost a melting point of the base layer, due to excellent heat resistance thereof, the shrinkage of the base layer may be partially blocked. However, the heat resistance of the coating layer is too small to completely block the shrinkage of the base layer due to low permeability and a loose net structure of the coating layer, and thus, this method is not suitable for forming a separator having improved thermal stability.

As most methods for improving heat resistance, there is provided a process of forming the coating layer of a heat-resistant resin using an organic solvent. Here, a large amount of organic solvent is used in order to dissolve the heat-resistant resin. The use of the organic solvent leads to deterioration in economical feasibility due to collection of the solvent or incineration after coating and drying of the organic solvent, and the organic solvent is not ecofriendly. In addition, the organic solvent has excellent affinity with polyolefin constituting the micro-porous polyolefin film, and thus is absorbed into the micro-porous polyolefin film during an application process. The heat-resistant resin is applied into the pores of the micro-porous polyolefin film by using an organic solvent where the heat-resistant resin is dissolved, after a drying process. The micro-porous polyolefin film applied with the heat-resistant resin reduces sizes of the pores due to the heat-resistant resin, resulting in decreasing the permeability. In addition, when a shut-down function of the micro-porous polyolefin film is expressed at a high temperature, the shut-down function of the micro-porous polyolefin film may be inhibited by the heat-resistant resin coated into the pores. As such, the use of the organic solvent for improving heat resistance may be environmentally problematic and cause basic functions of the micro-porous polyolefin film to be deteriorated, which cancels out advantages that is to be obtained by applying a heat-resistant layer. Moreover, even in the case of using the heat-resistant resin, long-term swelling and melting may occur in the organic electrolyte and the heat resistance thereof due to the swelling and melting may be observed.

Japanese Patent Application Nos. 2003-015766 and 2004-085059 disclose that water is used as a solvent at the time of an application process. However, in the case of using this water-soluble polymer, since the polymer itself has high affinity with water, the application layer may contain a large amount of moisture that may affect performances of the battery therein even after drying. This micro-porous composite film having a high moisture content may deteriorate the entire performance of the battery, such as cycle characteristics of the battery and long-term storage characteristics. Moreover, in the case of using the water-soluble polymer alone, the adhesive strength between the micro-porous polyolefin film and an inorganic material is not sufficient, which may cause problems during a battery assembling process and problems of stability inside the battery.

Japanese Patent Application No. 2004-227972 discloses that carboxyl methyl cellulose (CMC), which is a water-soluble polymer binder, is used to manufacture a separator for a non-aqueous electrolyte secondary battery. However, the long-term lifespan and cycle characteristics thereof may be deteriorated due to high affinity of the CMC with respect to moisture. Particularly, when the CMC is applied on the micro-porous polyolefin film, the surface tension value of an aqueous CMC solution is high, which may cause application thereof to be difficult. In order to solve this problem, a surfactant lowering surface tension necessarily be used. However, since the possibility of occurrence of an electrochemical sub-reaction due to the surfactant is high, the CMC requires special care. Moreover, since the CMC is easily broken when being mixed with the inorganic material due to deformation externally occurring, the application film thereof may be cracked or separated due to deformation resulting from the battery assembling process or the like, and this may affect performances and stability of the battery.

RELATED ART DOCUMENTS

Patent Documents

[Patent Document 1] Japanese Patent Application No. 2003-015766
[Patent Document 2] Japanese Patent Application No. 2004-085059
[Patent Document 3] Japanese Patent Application No. 2004-227972

DISCLOSURE OF INVENTION

Technical Problem

An embodiment of the present invention is directed to providing a high-heat resistant micro-porous polyolefin composite film, capable of minimizing the moisture content, improving adhesion strength, and securing high uniformity in product quality and product stability. Further, another embodiment of the present invention is directed to providing a high-heat resistant micro-porous polyolefin composite film, capable of simplifying a process and improving heat resistance and stability in a non-aqueous electrolyte. Further, still another embodiment of the present invention is directed to providing a high-heat resistant micro-porous polyolefin composite film, capable of securing high heat resistance and high permeability by using an inorganic material mixed with a polymer binder.

Solution to Problem

In one general aspect, there is provided a micro-porous polyolefin composite film formed by coating or laminating a solution containing a polymer binder and inorganic particles on a micro-porous film as a base layer, wherein the polymer binder includes 50 to 90 wt % of a non-aqueous polymer containing an acrylate group and having a glass transition temperature (Tg) of −60° C. to 0° C. and 50 to 10 wt % of an aqueous polymer having a melting point (Tm) or a glass transition temperature (Tg) of 200° C. or higher and a surface tension of 65 dyne/cm or less in a state of 0.5 wt % of an aqueous solution at 20° C., the aqueous polymer being preferably polyvinyl alcohol (PVA) having the above surface tension value, a copolymer thereof, or a mixture of at least one thereof.

Further, as the non-aqueous polymer, a polymer or a copolymer having an acrylate group may be preferably adopted, or styrene-butadiene may be used. Here, as the aqueous polymer, polyvinyl alcohols may be particularly adopted to thereby further achieve objects of the present invention.

More specifically, the non-aqueous polymer of the present invention is not limited. Preferably, examples of the polymer having an acrylate group may include at least one component selected from styrene-acrylics, styrene-butadiene, acrylics, vinyl acrylics, and a mixture thereof. Examples of the inorganic particle may include at least one selected from alumina, aluminum hydroxide, silica, barium titanium oxide, magnesium oxide, magnesium hydroxide, clay, titanium oxide, glass powder, boehmite, and a mixture thereof. In the present invention, the inorganic particle has an average diameter (D50) of 0.1 to 2.0 µm, which is more preferable in view of uniformity and stability of surface smoothness or physical properties of batteries.

According to the present invention, the shrinkage rate of the micro-porous polyolefin composite film in each of a machine direction and a transverse direction at 160° C. is 10% or less; the difference between the shutdown temperature of a micro-porous polyolefin composite film and the shutdown temperature of the micro-porous polyolefin film is 1° C. or lower; and the meltdown temperature of the micro-porous polyolefin composite film is 190° C. or higher.

In addition, the micro-porous polyolefin composite film of the present invention is characterized in that the adhesive strength of a porous coating layer with respect to the micro-porous polyolefin film is 1.5 Kg$_f$/cm$^2$ or greater, the adhesion retention in an electrolyte is 80% or higher, the permeability (Gurley) is 30 s to 500 s, and the permeability increase ratio depending on the thickness of the porous coating layer is 30 sec/µm or less.

The micro-porous polyolefin composite film of the present invention is manufactured by coating or laminating a solution containing the polymer binder and inorganic particles on at least one surface or two surfaces of the micro-porous polyolefin film, and then the final micro-porous polyolefin composite film may be used as a separator for a secondary battery.

In the polymer binder of the present invention, examples of the non-aqueous polymer may include styrene-acrylics, styrene-butadiene, acrylics, vinyl acrylics, carboxylated acrylic copolymers, and the like, but are not limited thereto. These non-aqueous polymers each may be applied alone, or one or more thereof may be simultaneously applied in a copolymer type. Preferably, acrylates having a glass transition temperature (Tg) in the range of −60° C. to 0° C., or copolymers thereof, may be used as the non-aqueous polymer.

As the aqueous polymer in the polymer binder of the present invention, 0.5 wt % of a solution preferably has a surface tension of 65 dyne/cm or less at 20° C., in order to be coated on a micro-porous polyolefin film having a low surface tension, 38~44 dyne/cm. More preferably, the aqueous polymer may be polyvinyl alcohol (PVA) satisfying the above characteristics and having a melting point (Tm) or a glass transition temperature (Tg) of 200° C. or higher, a copolymer thereof, or a mixture of at least one thereof, resulting in significant improvement in physical properties.

The inorganic particle has an average diameter (an average diameter of an aggregation in the case of a nanoparticle-sized aggregation) of 0.1 to 2.0 µm. Unlimited examples thereof may include at least one selected from the group consisting of alumina, aluminum hydroxide, silica, barium titanium oxide, magnesium oxide, magnesium hydroxide, clay, titanium oxide, glass powder, boehmite, and a mixture thereof.

The micro-porous polyolefin composite film manufactured according to one aspect of the present invention has the following characteristics:

(1) the shrinkage rate in each of a machine direction and a transverse direction at 160° C. is 10% or less;

(2) the difference between the shutdown temperature of the micro-porous polyolefin composite film and the shutdown temperature of the micro-porous polyolefin film is 1° C. or lower;

(3) the meltdown temperature of a multilayered micro-porous polyolefin composite film is 190° C. or higher;

(4) the adhesive strength of the porous coating layer with respect to the micro-porous polyolefin film is 1.5 $Kg_f/cm^2$ or greater, and the adhesion retention in an electrolyte is 80% or higher; and (5) the permeability (Gurley) is 30 to 500 s, and the permeability increase ratio depending on the thickness of the porous coating layer is 30 sec/µm or less.

The micro-porous polyolefin composite film according to the present invention may be manufactured by a general method adopted in the art, and for example, without particular limitation, may be manufactured by including the following stages.

(a) preparing a micro-porous polyolefin film;

(b) adding and dispersing inorganic particles in a solvent;

(c) mixing a polymer binder containing a non-aqueous polymer and an aqueous polymer with the solution prepared in the stage (b);

(d) coating the solution prepared in the stage (c) on at least one surface of the micro-porous polyolefin film to thereby form a porous coating layer on at least one surface or two surfaces of the micro-porous polyolefin film; and (e) drying the porous coating layer formed in the stage (d) to thereby remove a solvent.

Here, the micro-porous polyolefin film in the stage (a) may be prepared by the following stages (a1) to (a5), but any method that is known to the art may be adopted without particular limitation.

(a1) melting/pounding/extruding a mixture containing 20 to 50 wt % of polyethylene having a weight average molecular weight of $2.0 \times 10^5$~$4.5 \times 10^5$ and 80 to 50 wt % of a diluent at a phase separation temperature or higher to thereby form a thermodynamic single phase of molten material in an extruder;

(a2) subjecting the single phase of molten material to phase separation to thereby be molded into a sheet;

(a3) stretching the sheet prepared in the stage (a2) at a stretching ratio in each of a machine direction and a transverse direction of 3.0 times or greater;

(a4) extracting the diluent from the stretched film while a predetermined tension is applied, followed by drying; and (a5) performing a thermal setting process on the dried film to thereby remove residual stress of the dried film and reduce the shrinkage rate of the dried film.

The thus prepared micro-porous polyolefin film is subjected to the stages (b) to (e) above, and thus, the porous coating layer is formed on one surface or two surfaces of the micro-porous polyolefin film. In the present invention, the micro-porous polyolefin film having the porous coating layer formed thereon as described above is referred to as a "micro-porous polyolefin composite film".

Unlimited examples of the inorganic particle used in the stage (b) may include at least one selected from the group consisting of alumina, aluminum hydroxide, silica, barium titanium oxide, magnesium oxide, magnesium hydroxide, clay, titanium oxide, glass powder, boehmite, and a mixture thereof. The inorganic particle preferably has an average diameter of 0.1 to 2.0 µm. More preferably, an alumina having an alpha crystalline structure may be used. The inorganic particle is not deformed by external impact or force due to excellent rigidity thereof, and is not thermally deformed even at a high temperature of 200° C. or higher, and thus can prevent the shrinkage of the base layer, which occurs at a high temperature, through binding with the polymer binder. In addition, the inorganic particles have a porous ratio of 40 to 80% due to a structure of thereof itself, and thus can control permeability of the final product through an appropriate ratio with a heat-resistant resin. Due to these characteristics, there can be manufactured a separator maintaining high permeability and securing high-temperature stability simultaneously.

Particularly, the alumina having an alpha crystalline structure has excellent rigidity, and is most effective in cutting off a short circuit phenomenon caused by dendrite and foreign materials. The inorganic particle preferably has an average diameter of 0.1 to 2.0 µm in order to realize high-temperature stability and high permeability desired by the present invention. In the case where the average diameter of the inorganic particle (or including inorganic particles existing in a cluster form in spite of a particle crystalline size of several to several tens of nm) is 0.1 µm or less, the specific surface area thereof is large, and thus a large amount of polymer binder needs to be used in order to retain the same adhesive strength. Hence, the spaces among the inorganic particles are remarkably decreased, resulting in reduced permeability, with the result that it is difficult to realize high thermal stability and high permeability desired by the present invention. Whereas, in the case where the average diameter of the inorganic particle is 2.0 µm or more, the number of inorganic particles existing per unit area of the base layer is small, resulting in reducing the contact between the base layer and the inorganic particles, and thus fails to effectively prevent the shrinkage of the base layer.

Next, the polymer binder of the present invention will be described. The polymer binder of the present invention may include a mixture of 50 to 90 wt % of a non-aqueous polymer and 10 to 50 wt % of an aqueous polymer, preferably an aqueous polymer containing a polyvinyl alcohol based polymer. As the aqueous polymer used in the stage (c) of the present invention, 0.5 wt % of a solution preferably has a surface tension of 65 dyne/cm or less at 20° C. More preferable are polyvinyl alcohol (PVA) satisfying the above characteristics and having a melting point (Tm) or a glass transition temperature (Tg) of 200° C. or higher, a copolymer thereof, and a mixture containing them. The polymer binder needs to have a high heat resistance of 200° C. or higher for imparting high heat-resistance, and in that case, the desired shrinkage ratios at 160° C. and the meltdown temperature of 190° C. can be achieved. In the coating process, in order to form a uniform porous layer on the micro-porous polyolefin film having a low surface tension, the aqueous polymer needs to have a surface tension value of 65 dyne/cm or lower at a concentration thereof of 0.5 wt % and at 20° C. In the case of using a solution having a surface tension of above 65 dyne/cm, agglomeration of an application liquid occurs when the solution is coated on the micro-porous polyolefin film, and thus a uniform porous layer can not be formed. A surfactant may be separately used in order to reduce the surface tension, but this may cause an electrochemical side reaction. Therefore, a surface treatment apparatus, such as a corona or plasma apparatus, for improving a surface tension value of the micro-porous polyolefin film itself.

However, the use of only the aqueous polymer as a binder may cause several problems. For example, since a general aqueous polymer, such as carboxyl methyl cellulose (CMC) or the like, absorbs 10% or more of moisture at a humidity of 60% and at a temperature of 20° C., it is highly likely to cause deterioration in the performance of the battery. Whereas, PVA has highest resistance to moisture in the aqueous polymers, but is still problematic since it absorbs 5% or more of moisture at a humidity of 60% and at a temperature of 20° C. This moisture causes the generation of HF in the battery, which may cause fatal damage to electrodes, and thus deteriorate long-term lifespan and cycle characteristics. In order to solve the moisture problem, the content of the aqueous polymer needs to be minimized while heat resistance is secured, but in this case, the adhesive strength with the inorganic particles may not be sufficiently imparted.

Therefore, the present invention solves the above problems by using the non-aqueous polymer as a main component of the polymer binder and further containing a small amount of aqueous polymer, particularly, polyvinyl alcohols. The use of non-aqueous polymer allows the reduction of the content of the aqueous polymer, to thereby minimize the moisture content while the heat resistance of the coating layer is sufficiently secured. In addition, the non-aqueous polymer is used as a main component and a small amount of aqueous polymer is used, to thereby sufficiently compensate for the reduction in adhesive strength, which is caused by the decrease in the content of the aqueous polymer. Unlimited examples of the non-aqueous polymer capable of imparting the above characteristics may include styrene-acrylics, styrene-butadiene, acrylics, vinyl acrylics, carboxylated acrylic copolymer, and the like, but are not limited thereto. These non-aqueous polymers may be used alone or at least one thereof may be used in a copolymer type, together with the aqueous polymer. Alternatively, the non-aqueous polymer may be used in a mixture type containing the above components. The non-aqueous polymer is water-dispersed in a spherical latex type of several tens to several hundreds of nanometers, and the non-aqueous polymer is attached and fixed to the inorganic particles or the like while the moisture is evaporated. Due to water dispersible property of the non-aqueous polymer, the non-aqueous polymer may be easily mixed with the aqueous polymer. Preferably, acrylates having a glass transition temperature (Tg) in the range of −60° C. to 0° C. or copolymers thereof may be used as the non-aqueous polymer satisfying the above characteristics. In addition, the entire adhesive strength is better as the glass transition temperature is lower. However, if the glass transition temperature is below −60° C., stability thereof in a solution state is remarkably decreased, such as gels occur while the non-aqueous polymer is mixed with the inorganic particles, thereby reducing productivity. If the glass transition temperature is above 0° C., sufficient adhesive strength is not realized.

It was also found that when the non-aqueous polymer is used alone without the aqueous polymer, together with the inorganic particles, the adhesive strength as well as the heat resistance was significantly decreased. The clear reason is not known, but the reason is thought that since the latex of non-aqueous polymer is composed of particles having a size of several tens to several hundreds of nanometers, the contact area of the non-aqueous polymer with the inorganic particles having a wide specific surface area is not sufficient. In order to solve this problem, a large amount of non-aqueous polymer needs to be added to thereby improve adhesive strength. However, in this case, the permeability may be remarkably decreased, and even though a sufficient content of non-aqueous polymer itself is added, the shrinkage of the micro-porous polyolefin film that occurs at a high temperature of 130° C. or higher can not be prevented since the glass transition temperature thereof is in the range of −60° C. to 0° C. Therefore, it was found that the above problems can be solved when a polymer binder containing a large amount of non-aqueous polymer and a small amount of aqueous polymer is adopted like in the present invention.

In order to secure physical properties and performances represented in the present invention, the following component ratio is needed, but the present invention is not limited thereto.

The content of the inorganic particles of the present invention is preferably 10 to 70 wt % based on the entire solution including the polymer binder and the inorganic particles. In the present invention, the content of the polymer binder containing aqueous and non-aqueous polymers is preferably 0.5 to 7.0 wt % based on the entire solution including the polymer binder and the inorganic particles, and the content of the aqueous polymer is preferably 10 to 50 wt % in the entire non-aqueous and aqueous polymers. As the content of aqueous polymer is decreased and the content of non-aqueous polymer is increased, the adhesive strength and the moisture characteristics are further improved. However, since the decrease in the content of aqueous polymer results in reducing the heat resistance, the contents of aqueous polymer and non-aqueous polymer are important.

In the present invention, the method of coating the solution on the base layer is not particularly limited as long as the method is widely known in the art. Examples thereof may include a bar coating method, a rod coating method, a die coating method, a wire coating method, a comma coating method, a micro gravure/gravure method, a dip coating method, a spray method, or an ink-jet coating method, or a mixed method thereof, a modified method, and the like. After that, further, the porous coating layer may be planarized or partially removed by using a doctor blade, an air knife, a bar, or the like.

The porous coating layer coated on one surface or two surfaces of the base layer of the micro-porous polyolefin film in a solution state is subjected to a drying process under predetermined temperature and humidity, to thereby remove the solvent. The drying method may be performed by using an air blowing method, an IR heater method, a UV curing method, or the like, alone or in a combination thereof.

The thus prepared micro-porous polyolefin composite film has the following characteristics:

(1) the shrinkage rate in each of a machine direction and a transverse direction at 160° C. is 10% or less;

(2) the difference between the shutdown temperature of the micro-porous polyolefin composite film and the shutdown temperature of the micro-porous polyolefin film is 1° C. or lower;

(3) the meltdown temperature of a multilayered micro-porous polyolefin composite film is 190° C. or higher;

(4) the adhesive strength of the porous coating layer with respect to the micro-porous polyolefin film is 1.5 Kg$_f$/cm$^2$ or greater, and the adhesion retention in an electrolyte is 80% or more; and (5) the permeability (Gurley) is 30 to 500 s, and the permeability increase ratio depending on the thickness of the porous coating layer is 30 sec/μm or less.

Generally, the characteristics of the micro-porous polyolefin film for improving thermal stability of the lithium secondary battery are high-temperature shrinkage characteristics, maintenance of shutdown property, a high meltdown temperature, and the like. The shutdown property is one of the excellent properties of the micro-porous polyolefin film, and is referred to as a property in which micropores through which lithium ions pass at a temperature of 130° C. or lower are blocked at a temperature of 130° C. or higher, the melting point of a polyolefin resin. This property fundamentally cuts off the temperature increase due to abnormal behavior of the battery. However, for most methods for improving heat resistance, a process of forming a coating layer by using a heat resistant resin with an organic solvent is applied. The organic solvent has excellent affinity with polyolefin constituting the micro-porous polyolefin film, and thus the micro-porous polyolefin film is impregnated with the organic solvent in the coating process. Since the organic solvent contains a heat resistant resin, the heat-resistant resin is coated on the insides of the pores of the micro-porous polyolefin film after the drying process. The sizes of the pores of the micro-porous polyolefin film, which are coated with the heat resistant resin, are decreased due to the heat-resistant resin, resulting in reducing the permeability. Hence, when the shutdown function of the micro-porous polyolefin film is exhibited at a high temperature, the shutdown function of the micro-porous polyolefin film is prevented by the heat resistant resin coated on the insides of the pores. Therefore, in order to secure stability and reliability of the battery, the difference between the shutdown temperature of the micro-porous polyolefin composite film and the shutdown temperature of the micro-porous polyolefin film needs to be necessarily maintained 1° C. or less.

Among them, the meltdown temperature is a temperature at the time when the breakage of the micro-porous polyolefin film is observed due to deformation of the micro-porous polyolefin film, such as shrinkage or the like, at a high temperature. The higher the temperature at which the breakage is observed, the better the high-temperature stability. The meltdown temperature is a factor affected by thermal characteristics of a micro-porous polyolefin film material and stability of the micro-porous polyolefin film in an organic electrolyte, and the meltdown temperature of the micro-porous polyolefin film is 140° C. to 160° C. Since the capacitance and output of the existing IT product are not high, the use of the micro-porous polyolefin film may realize sufficient stability. However, the micro-porous polyolefin film lacks thermal stability, and thus can not be used alone in order to meet characteristics of high capacitance and high output. In addition, even in the case of a separator including a high heat-resistant fluorine resin having a melting temperature or a glass transition temperature of 170° C., when the high-resistant fluorine resin is dissolved and gelled in the organic electrolyte at a temperature of 140° C. to 160° C. or higher, it is difficult to increase the meltdown temperature to 160° C. or higher.

However, in the case of the micro-porous polyolefin composite film manufactured according to the present invention, a porous layer is formed by coating, on at least one surface of a base layer, a solution containing inorganic particles and a polymer binder, the polymer binder including a non-aqueous polymer having increased adhesive strength and reduced moisture content and an aqueous polymer not affected by an organic electrolyte in a specific ratio range, and thus, unexpected effects of excellent thermal stability and high stability with respect to the organic electrolyte, and thus improvement in reliability of the battery can be obtained.

The micro-porous polyolefin composite film according to the present invention has a shrinkage rate in each of a machine direction and a transverse direction of 10% or less at 160° C. for 60 minutes. Like the meltdown temperature, the shrinkage rate in each of the machine direction and the transverse direction at 160° C. exhibits thermal stability of the separator at a high temperature. If the shrinkage rate at a high temperature is above 10%, an inside temperature of the battery is increased, resulting in shrinkage, and two electrodes are exposed to each other, resulting in a short circuit between the electrodes occurs, and thus, the possibility of ignition and explosion is increased.

The adhesive strength between the coating layer and the micro-porous polyolefin film is preferably 1.5 kg$_f$/cm$^2$ or higher, and favorably 1.5 kg$_f$/cm$^2$ to 10 kg$_f$/cm$^2$. If the adhesive strength between the coating layer and the micro-porous polyolefin film is below 1.5 kg$_f$/cm$^2$, the coating layer may be separated in a slitting process and a battery assembling process even though the heat resistance and the high-temperature shrinkage of the coating layer are excellent, and thus, the battery assembling process is contaminated, which may cause defects such as pin holes in the micro-porous polyolefin film due to secondary or tertiary contamination, thereby rather deteriorating stability of the battery.

In addition, the micro-porous polyolefin composite film of the present invention is characterized in that, when an ultrasonic washing machine is operated for 10 minutes while the micro-porous polyolefin composite film is placed in the electrolyte, the residual area of the coating layer is 80% or more. In the case where the residual area of the coating layer is 80% or less, the porous layer constituting the micro-porous polyolefin composite film is separated in the battery due to deformation thereof into any form, abnormal behavior such as temperature increase, or fatigue accumulation due to the long-term use. The above phenomenon acts as a cause of deteriorating the uniformity of products and further rapidly deteriorating performance of the battery. Therefore, the coating layer needs to have a residual area of 80% or more, or not be separated.

In the present invention, the porous coating layer is formed on at least one surface or two surfaces of the micro-porous polyolefin film, and thus, the pores of the existing micro-porous polyolefin film are blocked, resulting in reducing the permeability. Particularly, in the case where the permeability of the micro-porous polyolefin composite film exceeds 500 sec due to formation of the porous coating layer, even the micro-porous polyolefin composite film having high heat resistance is not efficient since output characteristics of the battery and cycle characteristics of the battery are remarkably reduced. In the case where the permeability thereof is 30 seconds or less, the porous ratio and the permeability of the micro-porous polyolefin film is too high, thereby adversely affecting stability of the battery. As the results that multilayered micro-porous polyolefin composite films are manufactured by using micro-porous polyolefin films having various permeability values, it can be seen that the permeability (Gurley) range that is most stable and does not interfere the battery behavior is 30 to 500 seconds.

A micro-porous polyolefin composite film, of which the permeability increase ratio according to the thickness of the porous coating layer is 30 sec/μm or less within the above ranges of permeability and thickness, needs to be formed. In the case where the permeability increase ratio is increased to 30 sec/μm or higher, high output characteristics can not be achieved. In order to minimize the above problem, it is important to select an inorganic particle having a high porous ratio, and the mixing ratio of the aqueous polymer and the non-aqueous polymer is an important factor.

The inorganic particle acts as a factor that determines the porous ratio and the permeability of the porous coating layer, and is an important material improving heat stability at a high temperature. In the case where the inorganic particles are applied in a content of below 10 wt % based on the entire solution containing the polymer binder and the inorganic particles, it is difficult to realize the permeability as the final micro-porous polyolefin composite film, and heat stability thereof at a high temperature is significantly deteriorated. In the case where the inorganic particles are applied in a content of above 70 wt %, it is favorable to realize permeability but difficult to realize the desired adhesive strength. The dispersibility and phase stability of the coating solution are deteriorated due to presence of a large amount of inorganic materials, and thus, mass production thereof is difficult.

In the case where the content of the polymer binder is below 0.5 wt % based on the entire solution containing the polymer binder and the inorganic particles, it is difficult to impart heat resistance and adhesive strength of the porous coating layer. In the case where the content thereof is above 7 wt %, large of defective coatings occur due to the increase in viscosity of a solution and the increase in moisture content, and thus, productivity is decreased and permeability is difficult to realize, resulting in deteriorating performance of the battery.

Advantageous Effects of Invention

As set forth above, according to the present invention, there can be manufactured a micro-porous polyolefin composite film for a high-output/high-capacitance battery including the above-mentioned physical properties and having excellent adhesive strength and stability in product quality.

MODE FOR THE INVENTION

Hereinafter, the present invention will be described with reference to the following examples. The following examples are merely for explaining the present invention, and the present invention is not limited thereto.

Several characteristics of the micro-porous polyolefin composite film of the present invention are estimated by the following test methods.

(1) Thickness

The TESA-μHITE was used as a contact type thickness measurement device having a precision of 0.1 μm with respect to the thickness.

(2) Thickness of Porous Coating Layer

In the case where a porous coating layer is formed on a surface of a micro-porous polyolefin film, the thickness of the porous coating layer was calculated from a difference between the thickness of the micro-porous polyolefin film before application and the thickness of the micro-porous polyolefin film after coating. In addition, a cross section of the porous coating layer was cut by micro-toming, and then the cross section thereof was observed by using an electron microscope to thereby measure the thickness thereof.

(3) Particle Size

Analysis of the particle size was carried out by using S3500 from the Microtrac having a laser particle size analysis range of 0.02~2,000 μm. As necessary, the particle sizes were measured from an electron microscopic image with respect to a surface of the film.

(4) Gas Permeability (Gurley)

The gas permeability was measured by using a porometer (Gurley densometer from the Toyoseiki). The time period (sec) while a predetermined volume (100 ml) of gas passes through a predetermined area (1 in2) at a predetermined pressure (about 1~2 psig) was designated by the unit.

(5) Puncture Strength ($g_f$)

The puncture strength was measured by using UTM (Universal Test Machine) 3345 from the INSTRON, while pressing the sample at a rate of 120 mm/min. Here, as a pin, a pin tip having a diameter of 1.0 mm and a radius of curvature of 0.5 mm was used.

(6) Tensile Strength

The tensile strength was measured by ASTM D882.

(7) Shrinkage Rate

Figure 4:
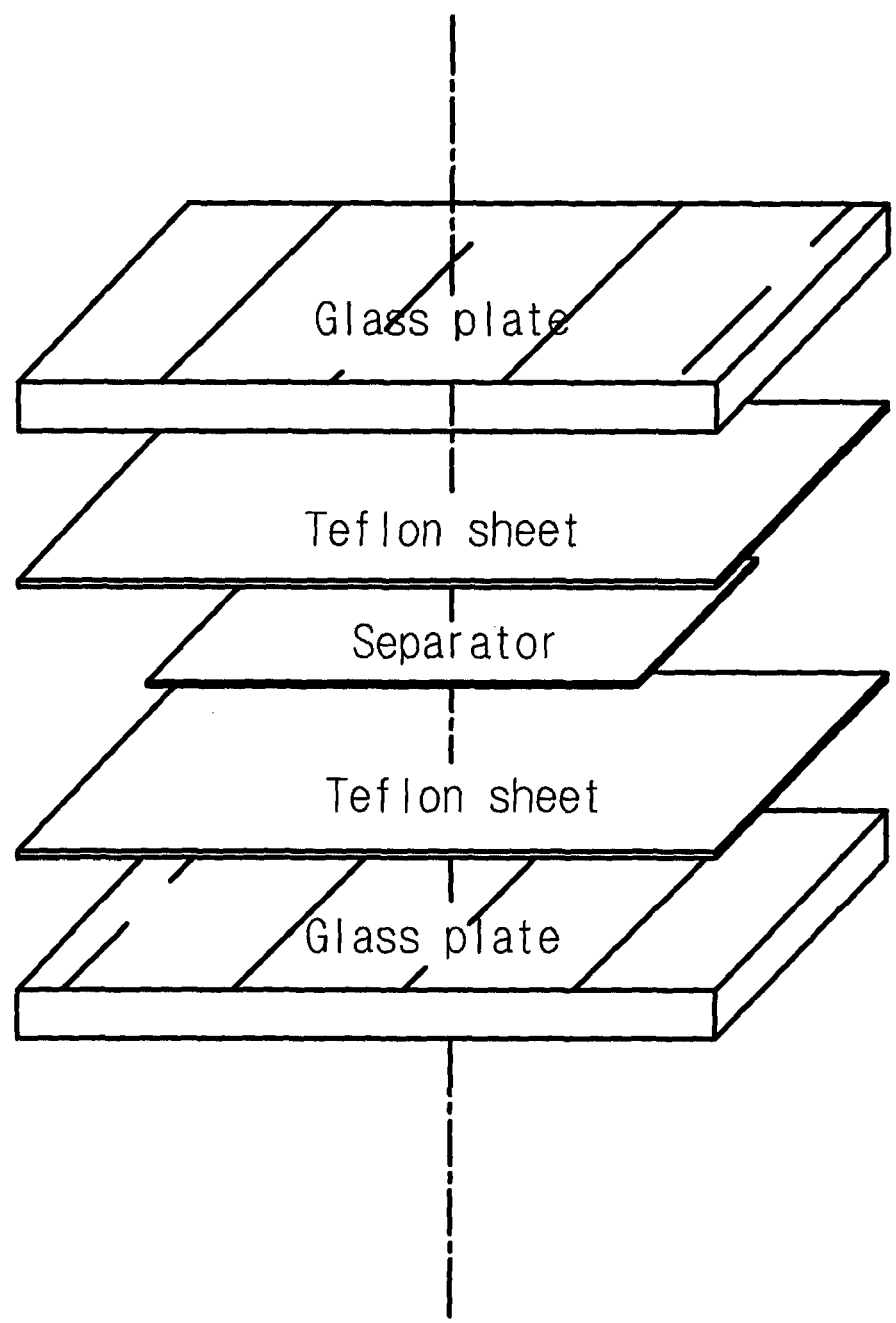
FIG. 4 is a view for explaining a method for measuring shrinkage rate at 160° C.

A micro-porous polyolefin film was left for 1 hour in an oven at 130° C., so as to be freely shrunken, and the shrinkage rate thereof was measured. In the case of a micro-porous polyolefin composite film having a porous coating layer formed thereon, the composite film to be measured was input between Teflon sheets between glass plates in an oven at 160° C. as shown in FIG. 4, and 7.5 mg/mm² of force is applied to the composite film. After the composite film was left for 1 hour in the oven at 160° C., the shrinkage in each of the machine direction and the transverse direction was measured, and then the final area shrinkage was calculated by a value of %.

(8) Shutdown Temperature and Meltdown Temperature

The shutdown temperature and meltdown temperature of a micro-porous polyolefin composite film was measured in a simple cell that can measure impedance. The simple cell was assembled while the multilayered micro-porous polyolefin composite film was interposed between two graphite electrodes and an electrolyte was injected therein. The electrical resistance was measured while temperature was raised from 25 to 200° C. at a rate of 5° C./min by using an alternating current of 1 kHz. Here, the temperature at which the electrical resistance is rapidly increased to several hundreds to several thousands of Ω or more was designated as the shutdown temperature, and the temperature at which the electrical resistance is again reduced to 100Ω or less was designated as the meltdown temperature. The electrolyte where lithium hexafluorophosphate (LiPF$_6$) was dissolved in a 1:1 solution of ethylene carbonate and propylene carbonate at a concentration of 1M was used.

(9) Adhesive Strength

Figure 5:
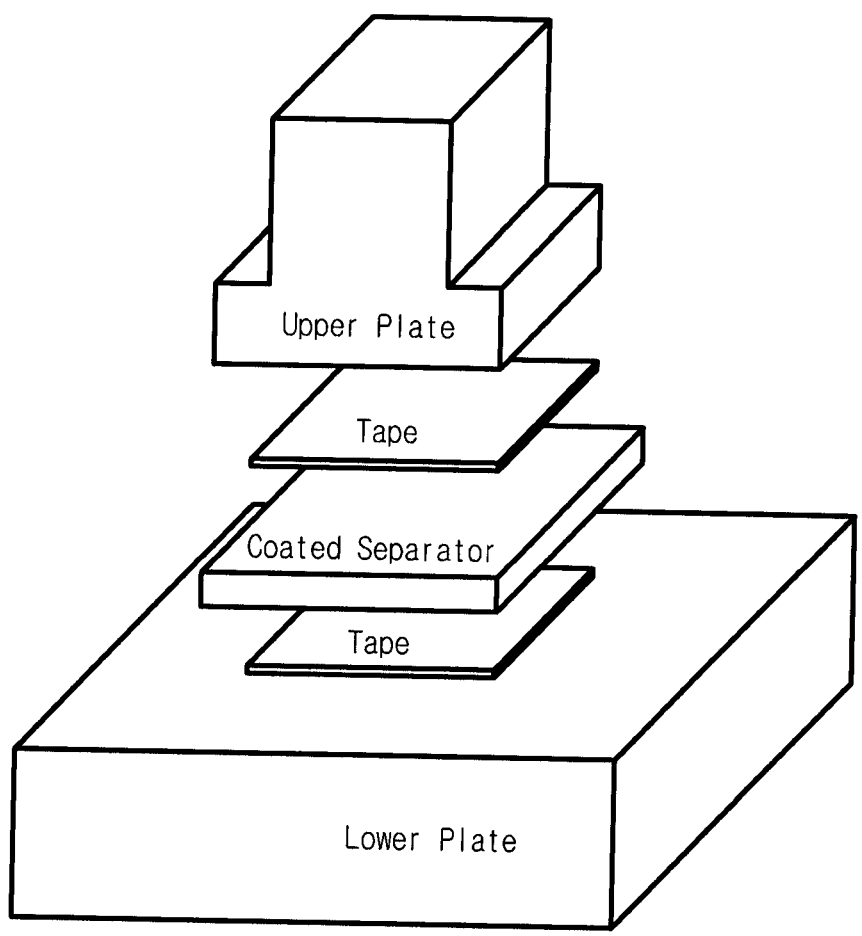
FIG. 5 is a view for explaining a method of measuring adhesive strength.

The adhesive strength was measured by using UTM 3345 made by the INSTRON Company. As shown in FIG. 5, 3M double sided tapes are attached between plates, and a micro-porous polyolefin composite film was input between the plates to thereby be attached onto the lower tape. Then an upper plate onto which the other tape was attached was controlled to thereby be attached the micro-porous polyolefin composite film. After that, the upper plate was pulled out at a rate of 250 mm/min.

Adhesive strength [Kg/cm$^2$]=measurement value/
area of tape applied to the upper plate [cm$^2$]   [Equation 1]

(10) Adhesion Retention

A micro-porous polyolefin composite film with 5 cm×5 cm size was input in a beaker containing a 1:1 solution of ethylene carbonate and propylene carbonate, and then an ultrasonic washing machine of which the frequency is 40 KHz and the HF-peak out is 200 W was operated for 10 minutes. After that, an electrolyte was washed out with methanol, followed by drying at 50° C. for 24 hours, and then an image analysis tool was used to calculate the residual area of the porous coating layer.

Adhesion retention of coating layer=residual coating
area after ultrasonic treatment*100/initial coating area   [Equation 2]

(11) Moisture Content

The moisture content was measured by using Karl Fischer 860 KF thermoprep and 831 KF coulometer positioned in the dry room. The measurement results, which were obtained by inputting a measurement sample in a vial, fixing the vial into the thermoprep, and then maintaining the vial for 300 seconds at 120° C., were converted into a ppm value. However, the measurement continued even after 300 seconds until the change in moisture content is decreased to 3 ug/min or less.

(12) Surface Tension

Three or more measurement values obtained when a Du Nouy ring or a plate was pulled out by using K100 from KRUSS Company were averaged.

EXAMPLE 1

High-density polyethylene having a weight average molecular weight of 3.8×10$^5$ was used in order to prepare a micro-porous polyolefin film. As a diluent, a mixture where dibutyl phthalate and paraffin oil having kinematic viscosity at 40° C. of 160 cSt were mixed at a ratio of 1:2 was used, and the contents of the polyethylene and the diluent were 30 wt % and 70 wt %, respectively. The above composition was extruded at 240° C. by using a dual-axial compounder installed with a T-die, and then passed through a section of which the temperature is set to 170° C., to thereby induce phase separation of the polyethylene and diluent present in a single phase, which was then molded into a sheet by using a casting roll. The sheet formed by using a sequential bi-axial stretching machine was stretched at a stretching rate of 6 times in each of the machine direction and the transverse direction at a stretching temperature of 128° C., respectively. The heat setting temperature after stretching was 128° C. and the heat setting width was 1-1.2-1.1. The prepared micro-porous polyethylene film had a final thickness of 16 μm, a gas permeability (Gurley) of 130 sec, and a shutdown temperature of 140° C.

The micro-porous polyolefin film prepared by the above method was used, and a coating solution was prepared by dissolving 2.6 wt % of polyvinyl alcohol having a melting point of 220° C. and a saponification degree of 98%, 3.1 wt % of acrylic latex having a Tg of −45° C. (Rovene 6050) as a solid, and 47 wt % of an Al$_2$O$_3$ powder (average diameter: 0.4 μm) in deionized water. The coating solution was coated on a cross section of the micro-porous polyolefin film by using a die coating method, and then the solvent was removed/dried in an oven at 60° C. by applying a predetermined amount of wind, thereby finally manufacturing a micro-porous polyolefin composite film having a porous coating layer having a thickness of 4.2 μm.

Figure 3:
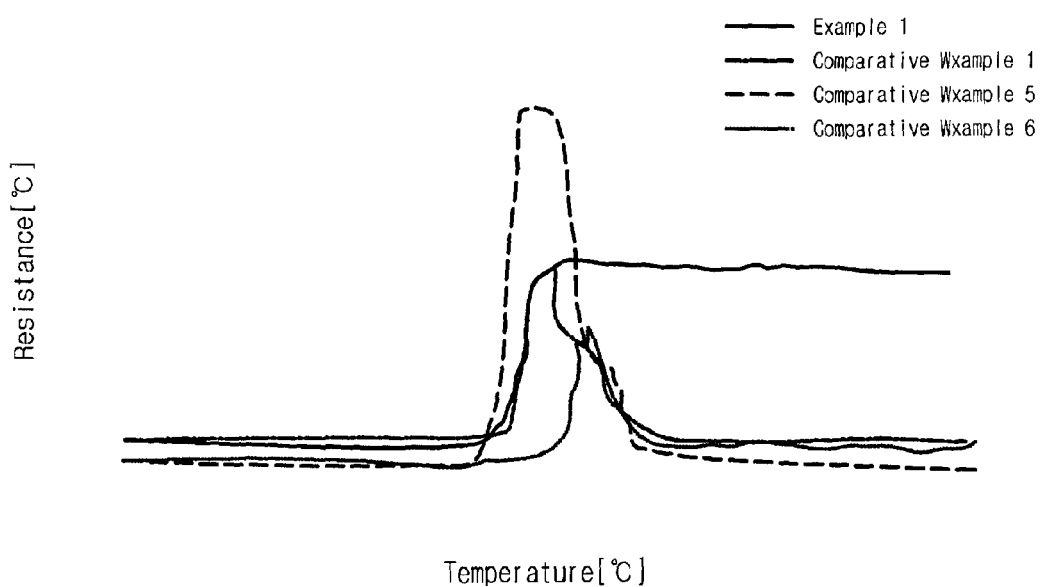
FIG. 3 is a graph showing the shutdown temperature and meltdown temperature according to each of Example 1 and Comparative Examples 1, 5, and 6.

The shutdown temperature and the meltdown temperature experiment results obtained by using the micro-porous polyolefin composite film manufactured according to the corresponding method were shown in FIG. 3.

Figure 1:
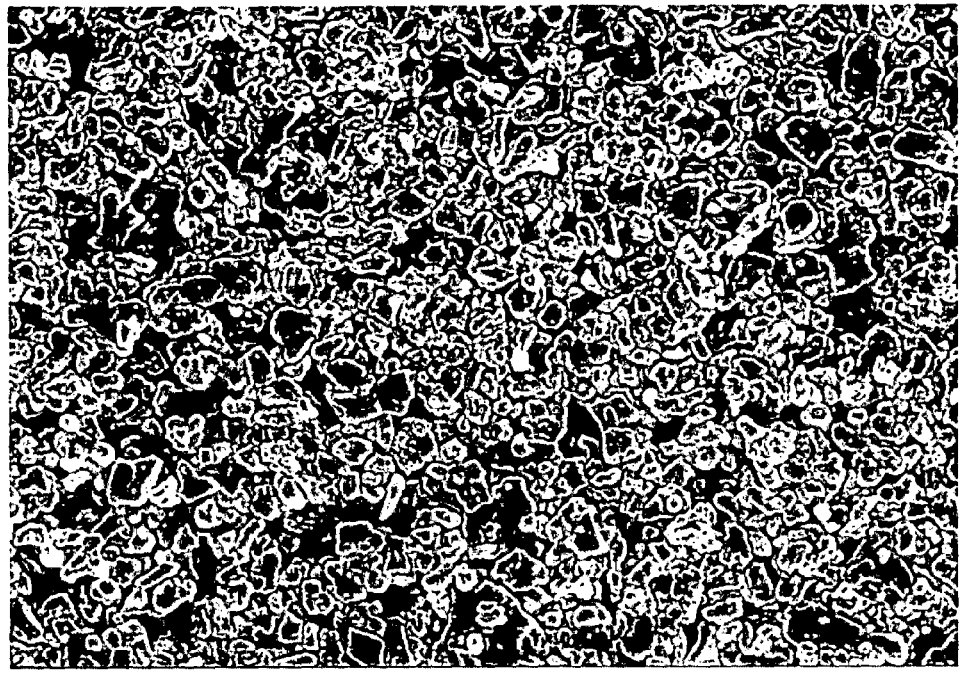
FIG. 1 is an electron microscopic image showing a surface of a micro-porous polyolefin composite film according to Example 1.
Figure 2:
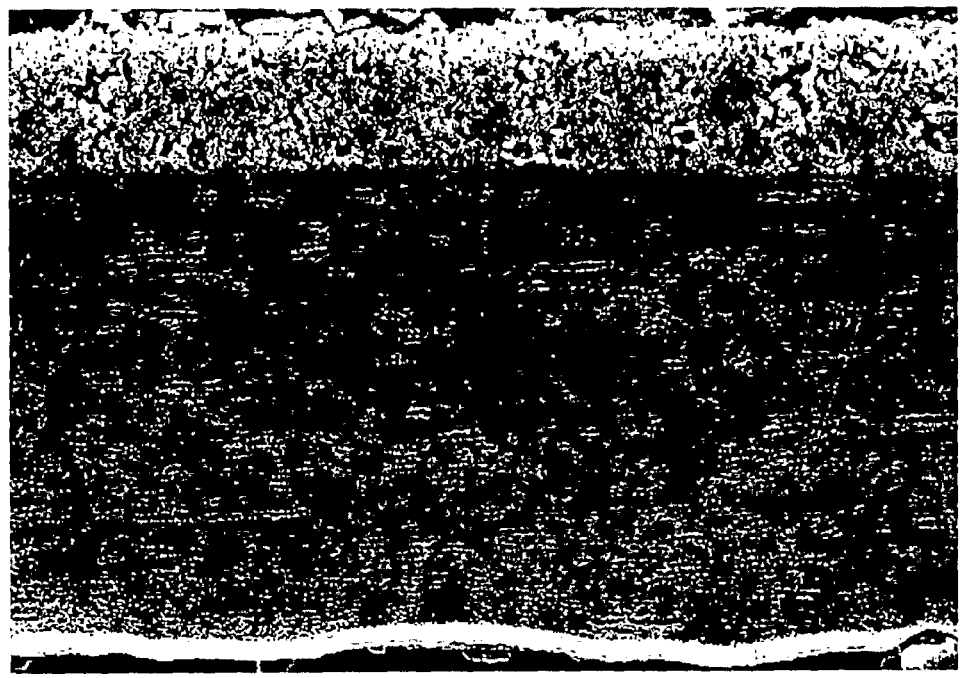
FIG. 2 is an electron microscopic image showing a cross section of the micro-porous polyolefin composite film according to Example 1.

A surface image and a cross section image of the micro-porous polyolefin composite film manufactured according to the corresponding method were shown in FIG. 1 and FIG. 2, respectively.

EXAMPLE 2

High-density polyethylene having a weight average molecular weight of 3.8×10$^5$ was used in order to prepare a micro-porous polyolefin film. As a diluent, a mixture where dibutyl phthalate and paraffin oil having kinematic viscosity at 40° C. of 160 cSt were mixed at a ratio of 1:2 was used, and the contents of the polyethylene and the diluent were 25 wt % and 75 wt %, respectively. The above composition was extruded at 240° C. by using a dual-axial compounder installed with a T-die, and then passed through a section of which the temperature is set to 170° C., to thereby induce phase separation of the polyethylene and diluent present in a single phase, which was then molded into a sheet by using a casting roll. The sheet formed by using a sequential bi-axial stretching machine was stretched at a stretching rate of 7 times in each of the machine direction and the transverse direction at a stretching temperature of 128° C., respectively. The heat setting temperature after stretching was 126° C. and the heat setting width was 1-1.2-1.2. The prepared micro-porous polyethylene film had a final thickness of 9 μm, a gas permeability (Gurley) of 110 sec, and a shutdown temperature of 139° C.

The micro-porous polyolefin film prepared by the above method was used, and a coating solution was prepared by dissolving 0.5 wt % of a silanol-polyvinyl alcohol copolymer a melting point of 225° C. and a saponification degree of 97.5%, 1.5 wt % of carboxylated stylene butadiene latex having a Tg of −24° C. (Rovene 4305), and 22 wt % of a plate shaped Al$_2$O$_3$ powder (average diameter: 1.5 μm) having an aspect ratio of 10 to 20 deionized water. The coating solution was coated on a cross section of the micro-porous polyolefin film by using a Micro-gravure coating method, and then the solvent was removed/dried in an oven at 60° C. by applying a predetermined amount of wind, thereby finally manufacturing a micro-porous polyolefin composite film having a porous coating layer having a thickness of 3.5 µm.

EXAMPLE 3

The micro-porous polyolefin film prepared by the method of Example 1 was used, and a solution was prepared by dissolving 0.6 wt % of polyvinyl alcohol having a melting point of 220° C. and a saponification degree of 99%, 4.0 wt % of acrylic latex having a Tg of −45° C. (Rovene 6050) as a solid, and 40 wt % of an $Al_2O_3$ powder (average diameter: 0.6 µm) in deionized water. The coating solution was coated on a cross section of the micro-porous polyolefin film by using a die coating method, and then the solvent was removed/dried in an oven at 60° C. by applying a predetermined amount of wind, thereby finally manufacturing a micro-porous polyolefin composite film having a porous coating layer having a thickness of 2.5 µm.

Comparative Example 1

The micro-porous polyethylene film prepared by the method of Example 1 was used alone without a porous coating layer.

Comparative Example 2

The micro-porous polyethylene film prepared by the method of Example 2 was used, and a coating solution was prepared by dissolving 5 wt % of acrylic latex (Rovene 6050), as a non-aqueous polymer, having a Tg of −45° C., and 40 wt % of $Al_2O_3$ powder (average diameter: 0.4 µm) in deionized water and adding 0.2 wt % of polysiloxane based wetting agent thereto. The coating solution was coated on a cross section of the micro-porous polyolefin film by using a die coating method, and then the solvent was removed/dried in an oven at 60° C. by applying a predetermined amount of wind, thereby finally manufacturing a micro-porous polyolefin composite film having a porous coating layer having a thickness of 7.2 µm.

Comparative Example 3

The micro-porous polyethylene film prepared by the method of Example 1 was used, and a coating solution was prepared by dissolving 2.5 wt % of polyvinyl alcohol having a melting temperature of 220° C. and a saponification degree of 89%, and 45 wt % of $Al_2O_3$ powder (average diameter: 0.6 µm) in deionized water. The coating solution was coated on a cross section of the micro-porous polyolefin film by using a vacuum chamber die coating method, and then the solvent was removed/dried in an oven at 60° C. by applying a predetermined amount of wind, thereby finally manufacturing a micro-porous polyolefin composite film having a porous coating layer having a thickness of 6.0 µm.

Comparative Example 4

The micro-porous polyethylene film prepared by the method of Example 1 was used, and a coating solution was prepared by dissolving 1.0 wt % of carboxylmethyl cellulose (Daicel 1240) having a browning temperature of 220° C. and 35 wt % of $Al_2O_3$ powder (average diameter: 0.6 µm) in deionized water and adding 0.2 wt % of polyether based wetting agent thereto. The coating solution was coated on a cross section of the micro-porous polyolefin film by using a vacuum chamber die coating method, and then the solvent was removed/dried in an oven at 60° C. by applying a predetermined amount of wind, thereby finally manufacturing a micro-porous polyolefin composite film having a porous coating layer having a thickness of 5.2 µm. However, the porous coating layer was easily broken, and thus physical properties thereof could not be measured.

Comparative Example 5

The micro-porous polyethylene film prepared by the method of Example 1 was used, and a coating solution was prepared by dissolving 5 wt % of polyvinylidene difluoride-hexafluoropropylene (PVDF-HFP) (FLEX 2801 from Kynar Company) having a melting temperature of 160° C. and 25 wt % of $Al_2O_3$ powder (average diameter: 0.4 µm) in acetone. The coating solution was coated on both surfaces of the micro-porous polyolefin film by using a dip coating method, and then the acetone was removed/dried in an oven at 50° C. at a humidity of 80% by applying a predetermined amount of wind, thereby finally manufacturing a micro-porous polyolefin composite film having a porous coating layer having a thickness of 4.0 µm.

Comparative Example 6

The micro-porous polyethylene film prepared by the method of Example 1 was used, and a coating solution was prepared by dissolving 3 wt % of polycarbonate (PC) (Trirex 3020HF from Samyang Company) having a melting temperature of 200° C. and 31 wt % of $BaTiO_3$ powder (average diameter: 0.4 µm) in n-methyl-2-pyrrolidone (NMP). The coating solution was coated on a cross section of the micro-porous polyolefin film by using a Micro-gravure coating method, and then the NMP was removed/dried in an oven at 50° C. and humidity of 80% by applying a predetermined amount of wind, thereby finally manufacturing a micro-porous polyolefin composite film having a porous coating layer having a thickness of 2.5 µm.

Comparative Example 7

In Comparative Example 4, a coating solution was prepared by dissolving 3.2 wt % of CMC, 6.0 wt % of carboxylated styrene butadiene Latex (Rovene 6105) having a Tg of −31° C., and 35 wt % of $Al_2O_3$ powder (average diameter: 0.4 µm) in deionized water and adding 0.5% of a wetting agent (polysiloxane based) thereto The coating solution was coated on a cross section of the micro-porous polyolefin film by using a die coating method, and then the solvent was removed/dried in an oven at 60° C. by applying a predetermined amount of wind, thereby finally manufacturing a micro-porous polyolefin composite film having a porous coating layer having a thickness of 3.5 µm.

Comparative Example 8

The micro-porous polyolefin film prepared by the method of Example 1 was used, and a solution was prepared by dissolving 0.7 wt % of polyvinyl alcohol having a melting point of 220° C. and a saponification degree of 99%, 8.6 wt % of acrylic latex (Rovene 6050) having a Tg of −45° C., and 35 wt % of an $Al_2O_3$ powder (average diameter: 0.7 am) in deionized water. The coating solution was coated on a cross section of the micro-porous polyolefin film by using a die coating method, and then a solvent was removed/dried in an oven at 60° C. by applying a predetermined amount of wind, thereby finally manufacturing a micro-porous polyolefin composite film having a porous coating layer having a coating thickness of 3.8 µm.

Comparative Example 9

The micro-porous polyolefin film prepared by the method of Example 1 was used, and a solution was prepared by dissolving 0.6 wt % of polyvinyl alcohol having a melting point of 220° C. and a saponification degree of 99%, 1.6 wt % of acrylic latex (Rovene 6005) having a Tg of −38° C., and 41 wt % of an $Al_2O_3$ powder (average diameter: 0.6 μm) in deionized water. The coating solution was coated on a cross section of the micro-porous polyolefin film by using a die coating method, and then a solvent was removed/dried in an oven at 60° C. by applying a predetermined amount of wind, thereby finally manufacturing a micro-porous polyolefin composite film having a porous coating layer having a coating thickness of 4.1 μm.

TABLE 1

|  |  | Example 1 | Example 2 | Example 3 |
|---|---|---|---|---|
| Non-aqueous polymer | Sort | Acrylic | Carboxyl-SBR | Acrylic |
|  | Tg (° C.) | −45 | −24 | −45 |
|  | Content (wt %) | 3.1 | 1.5 | 4.0 |
|  | Non-aqueous/entire polymer content ratio (wt %) | 54% | 75% | 86% |
| Aqueous polymer | Sort | PVA | Silanol-PVA | PVA |
|  | Melting temperature (° C.) | 220 | 225 | 220 |
|  | Saponification degree (%) | 98% | 97.5% | 99.0% |
|  | Surface tension (mN/m) | 62 | 63 | 64 |
|  | Content (wt %) | 2.6 | 0.5 | 0.6 |
|  | aqueous/entire polymer content ratio (wt %) | 46% | 25% | 14% |
| Inorganic particle | Sort | $Al_2O_3$ | Plate type $Al_2O_3$ | $Al_2O_3$ |
|  | Average diameter (μm) | 0.4 | 1.5 | 0.6 |
|  | Content (wt %) | 47 | 22 | 40 |
| Wetting agent | Content (wt %) | — | — | — |
| Coating method | Sort | Die | Micro-gravure | Die |

TABLE 2

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Non-aqueous polymer | Sort | — | Acrylic | — | — | — | — | Carboxyl-SBR | Acrylic | Acrylic |
|  | Tg (° C.) | — | −45 | — | — | — | — | −31 | −45 | −38 |
|  | Content (wt %) | — | 5.0 | — | — | — | — | 6 | 8.6 | 1.6 |
|  | Non-aqueous/entire polymer content ratio (wt %) | — | 100% | — | — | — | — | 65% | 92% | 44% |
| Aqueous polymer | Sort | — | — | PVA | CMC | PVDF-HFP | PC | CMC | PVA | PVA |
|  | Melting temperature (° C.) | — | — | 220 | 220 | 160 | 200 | 220 | 220 | 220 |
|  | Saponification degree (%) | — | — | 89% | — | — | — | — | 99% | 99% |
|  | Surface tension (mN/m) | — | — | 52 | 72 | <40 | <40 | 72 | 63 | 64 |
|  | Content (wt %) | — | — | 2.5 | 1.0 | 5.0 | 3.0 | 3.2 | 0.7 | 2 |
|  | aqueous/entire polymer content ratio (wt %) | — | — | 100% | 100% | 100% | 100% | 35% | 8% | 56% |
| Inorganic particle | Sort | — | $Al_2O_3$ | $Al_2O_3$ | $Al_2O_3$ | $Al_2O_3$ | $BaTiO_3$ | $Al_2O_3$ | $Al_2O_3$ | $Al_2O_3$ |
|  | Average diameter (μm) | — | 0.4 | 0.6 | 0.6 | 0.4 | 0.4 | 0.4 | 0.7 | 0.6 |
|  | Content (wt %) | — | 40 | 45 | 35 | 25 | 31 | 35 | 35 | 48 |
| Wetting agent | Content (wt %) | — | 0.2 | — | 0.2 | — | — | 0.5 | — | — |
| Coating method | Sort | — | Die | Die | VCD | Dip | Micro-gravure | Die | Die | Die |

TABLE 3

|  |  | Example 1 | Example 2 | Example 3 |
|---|---|---|---|---|
| Fabric | Thickness | 16 um | 9 um | 16 um |
|  | Gurley | 130 | 110 | 130 |
|  | Shutdown temperature (° C.) | 140 | 139 | 140 |
| measurement | Thickness (μm) | 4.2 | 3.5 | 2.5 |
|  | Gurley (s) | 155 | 206 | 198 |
|  | Permeability increase ratio (sec/μm) | 6.0 | 27.4 | 27.2 |
|  | Shutdown temperature (° C.) | 140 | 140 | 140 |
|  | Meltdown temperature (° C.) | >195 | >195 | 193 |
|  | Shrinkage % at 160° C. (MD/TD) | 2.7/2.3 | 3.5/2.6 | 7.23/6.4 |
|  | Adhesive strength (Kgf/cm²) | 1.9 | 2.7 | 2.9 |
|  | Adhesion retention (%) | 95 | 90 | 84 |

TABLE 3-continued

|  | Example 1 | Example 2 | Example 3 |
|---|---|---|---|
| Moisture content (ppm) | 623 | 352 | 290 |

TABLE 4

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|
| Fabric | Thickness | 16 um | 9 um | 16 um | 16 um | 16 um | 16 um | 16 um | 16 um | 16 um |
| | Gurley | 130 | 110 | 130 | 130 | 130 | 130 | 130 | 130 | 130 |
| | Shutdown temperature (° C.) | 140 | 139 | 140 | 140 | 140 | 140 | 140 | 140 | 140 |
| measurement | Thickness (μm) | — | 7.2 | 6.0 | 5.2 | 2/2 | 2.5 | 3.5 | 3.8 | 4.1 |
| | Gurley (s) | 130 | 430 | 286 | X | 216 | 260 | 192 | 328 | 183 |
| | Permeability increase ratio (sec/μm) | — | 139.1 | 26.0 | X | 21.5 | 52.0 | 17.7 | 52.1 | 12.9 |
| | Shutdown temperature (° C.) | 140 | 140 | 140 | X | 142 | 146 | 141 | 140 | 140 |
| | Meltdown temperature (° C.) | 153 | 153 | >195 | X | 159 | 160 | 173 | 162 | 192 |
| | Shrinkage % at 160° C. (MD/TD) | 50/55 | 18/20 | 3.2/3.9 | X | 47/15 | 0.7/0.3 | 1.5/1.2 | 19/14 | 4.2/3.4 |
| | Adhesive strength (Kgf/cm²) | — | 0.5 | 1.1 | X | 0.6 | 0.4 | 1.2 | 2.9* | 0.9 |
| | Adhesion retention (%) | — | 0 | 98 | X | 0 | 0 | 0 | 62 | 86 |
| | Moisture content (ppm) | 32 | 325 | 1683 | X | 552 | 389 | 2017 | 396 | 1452 |

According to the examples of the present invention, there is provided a micro-porous composite film satisfying the following physical properties: the shrinkage rate in each of the machine direction and the transverse direction at 160° C. is 10% or less; the difference between the shutdown temperature of the micro-porous polyolefin composite film and the shutdown temperature of the micro-porous polyolefin film is 1° C. or lower; the meltdown temperature of the micro-porous polyolefin composite film is 190° C. or higher; the adhesive strength of the porous coating layer with respect to the micro-porous polyolefin film is 1.5 Kg/cm² or greater; and the adhesion retention in an electrolyte is 80% or more; and the permeability (Gurley) is 30 to 500 seconds, and the permeability increase ratio depending on the thickness of the porous coating layer is 30 sec/μm or less. Comparative Example 1 having only the micro-porous polyolefin film without the porous coating layer of the micro-porous polyolefin composite film has a meltdown temperature of 153° C., which was very low, a high shrinkage rate at 160° C., resulting in deteriorating high-temperature stability, and thus, has a limitation in being applied to a battery requiring high output and high capacitance. Comparative Example 2 for overcoming the above problem, that is, the micro-porous polyolefin film obtained by coating only the non-aqueous polymer having a Tg of −45° C. had a permeability increase ratio of 139.1 sec/μm, a high shrinkage rate at 160° C., and a low meltdown temperature, 153° C., and thus deteriorating stability and output characteristics and deteriorating stability in the battery due to low adhesion retention in the electrolyte. In Comparative Example 3, which is a micro-porous polyolefin composite film formed by using the aqueous polymer alone, the adhesive strength was not sufficient, and thus, the porous coating layer may be separated during an assembling process or the like, and the cycle characteristics of the battery may be problematic due to high moisture content. In the case of Comparative Example 4, CMC was used as an aqueous polymer, but the adhesive strength was too decreased, and thus, physical properties thereof could not be measured. Comparative Example 5 obtained by using PVDF had problems, such as low heat resistance and adhesive strength, and swelling and melting in the electrolyte. In the case of Comparative Example 6, the heat resistance was improved by using polycarbonate, but since the polymer was melted in the electrolyte and the difference in shutdown temperature from the micro-porous polyolefin film was 6° C., the micro-porous polyolefin composite film could not sensitively respond to the increase in temperature, which occurs at the time of abnormal behavior of the battery, resulting in deteriorating stability thereof. In the case of Comparative Example 7, the carboxyl-SBR compensated from the low adhesive strength of CMC, which is an aqueous polymer, but the adhesive strength and the adhesion retention in the electrolyte were significantly decreased, and the moisture content was very high. In the case of Comparative Example 8, the content of non-aqueous polymer was high, and thus, the increase ratio in permeability was high, which was 52.1 sec/um, so that the micro-porous polyolefin composite film could not meet characteristics of the battery requiring high output and the heat resistance at a high temperature and the adhesion retention in the electrolyte were reduced. In the case of Comparative Example 9, the content of aqueous polymer accounted for 56% of the content of the entire binder, and thus, the moisture content was high.

The invention claimed is:

1. A micro-porous polyolefin composite film including a single porous coating layer formed by coating or laminating a solution containing a polymer binder and inorganic particles on a micro-porous polyolefin film as a base layer, wherein the polymer hinder includes 54 to 86 wt % of a non-aqueous polymer having a glass transition temperature (Tg) of −60° C. to 0° C. and 46 to 14 wt % of an aqueous polymer having a melting point (Tm) or a glass transition temperature (Tg) of 200° C. or higher and a surface tension of 65 dyne/cm or less in a state of 0.5 wt % of an aqueous solution thereof at 20° C., wherein the aqueous polymer is a partially saponificated polyvinyl alcohol (PVA), a copolymer thereof, or a mixture thereof, wherein the non-aqueous polymer includes at least one component selected from the group consisting of styrene-acrylics, styrene-butadiene, acrylic latex, and a mixture thereof, wherein the polymer binder comprises from 0.5 to 7.0 wt % of the solution based on the entire weight of the solution, wherein the inorganic particle has an average diameter (D50) of 0.1 to 2 μm, and wherein micro-porous polyolefin composite film has the following physical properties: an adhesive strength of the single porous coating layer with respect to the micro-porous polyolefin film is 1.5 Kgf/cm$^2$ or greater; an adhesion retention in an electrolyte is 80% or more, a permeability (Gurley) is 30 to 500 s; and a permeability increase ratio depending on the thickness of the single porous coating layer is 30 sec/μm or less.

2. The micro-porous polyolefin composite film of claim 1, wherein the inorganic particle is at least one selected from the group consisting of alumina, aluminum hydroxide, silica, barium titanium oxide, magnesium oxide, magnesium hydroxide, clay, titanium oxide, glass powder, boehmite, and a mixture thereof.

3. The micro porous polyolefin composite film of claim 1, wherein it has the following physical properties: a shrinkage rate in each of a machine direction and a transverse direction at 160° C. is 10% or less; a difference between a shutdown temperature of the micro-porous polyolefin composite film and a shutdown temperature of the micro-porous polyolefin film is 1° C. or lower; and a meltdown temperature is 190° C. or higher.

4. The micro-porous polyolefin composite film of claim 1, wherein the partially saponificated polyvinyl alcohol polymer is a partially saponificated silanol-polyvinyl alcohol copolymer.

* * * * *

UNITED STATES PATENT AND TRADEMARK OFFICE
CERTIFICATE OF CORRECTION

PATENT NO.        : 9,562,164 B2                                    Page 1 of 1
APPLICATION NO.   : 14/355729
DATED             : February 7, 2017
INVENTOR(S)       : Yong Kyoung Kim et al.

It is certified that error appears in the above-identified patent and that said Letters Patent is hereby corrected as shown below:

In the Claims

Column 21, Line 6, Claim 1, delete "hinder" and insert -- binder --

Column 22, Line 13, Claim 3, delete "micro porous" and insert -- micro-porous --

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*